Figure 1:
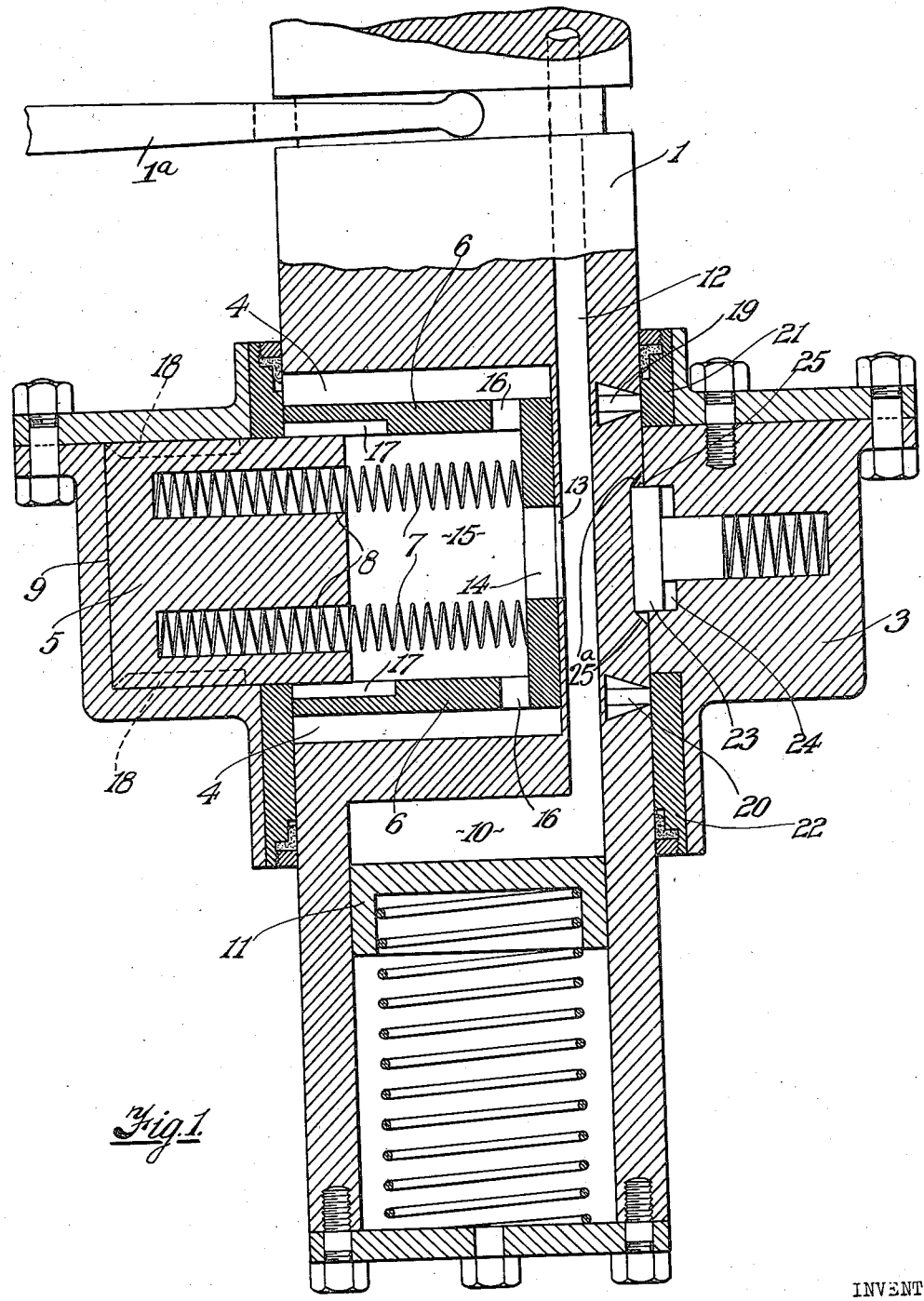

Patented Aug. 11, 1936

2,050,955

UNITED STATES PATENT OFFICE 2,050,955

HYDRAULIC CLUTCH

Herbert Cleave Lee, North Ealing, London, England

Application December 23, 1935, Serial No. 55,907
In Great Britain October 6, 1934

7 Claims. (Cl. 192—58)

This invention relates to hydraulic clutches and has for its object to provide a clutch of improved and simplified construction and which is adapted to be controlled by axial movement of the driving member.

The invention comprises various features of construction and method of operation which will be hereinafter described and claimed.

Figure 2:
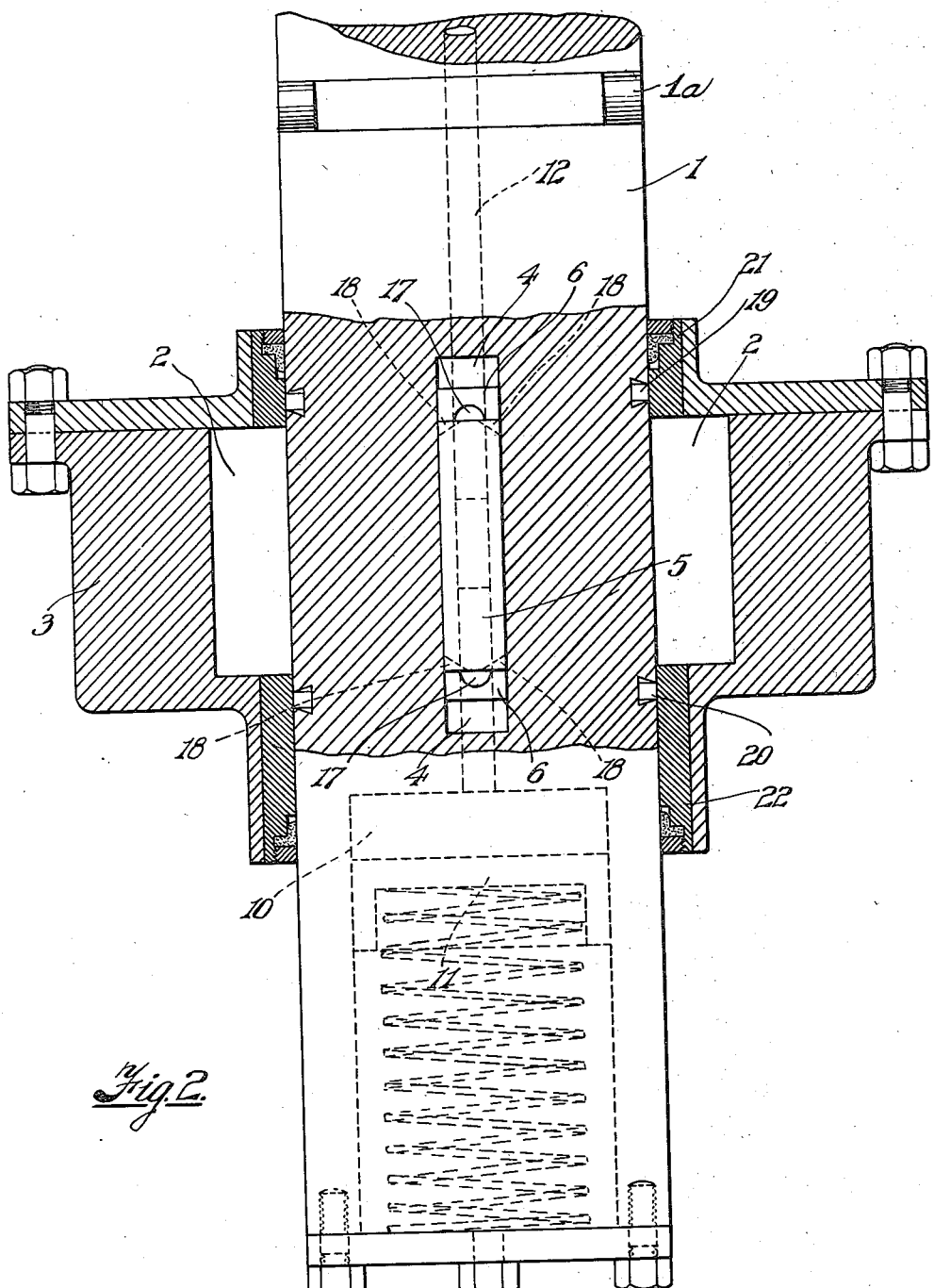
Figure 3:
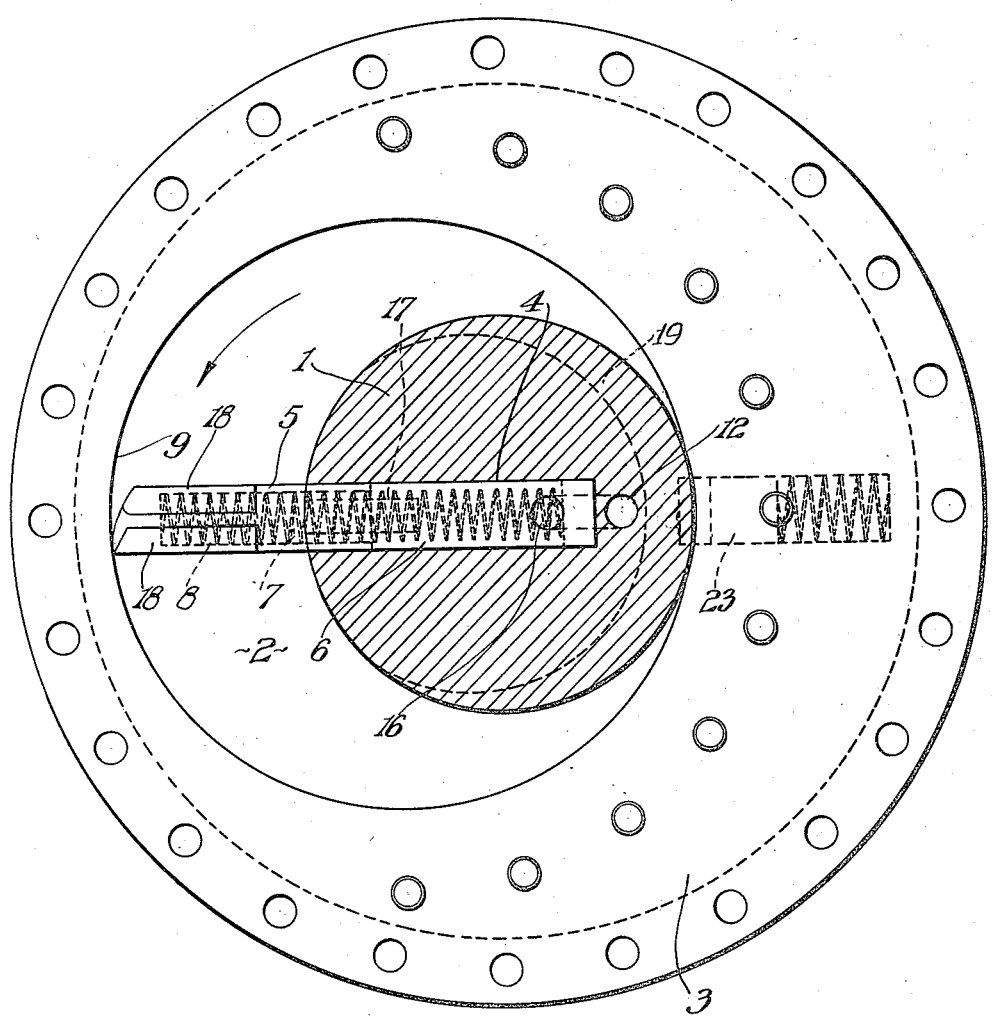
Figure 4:
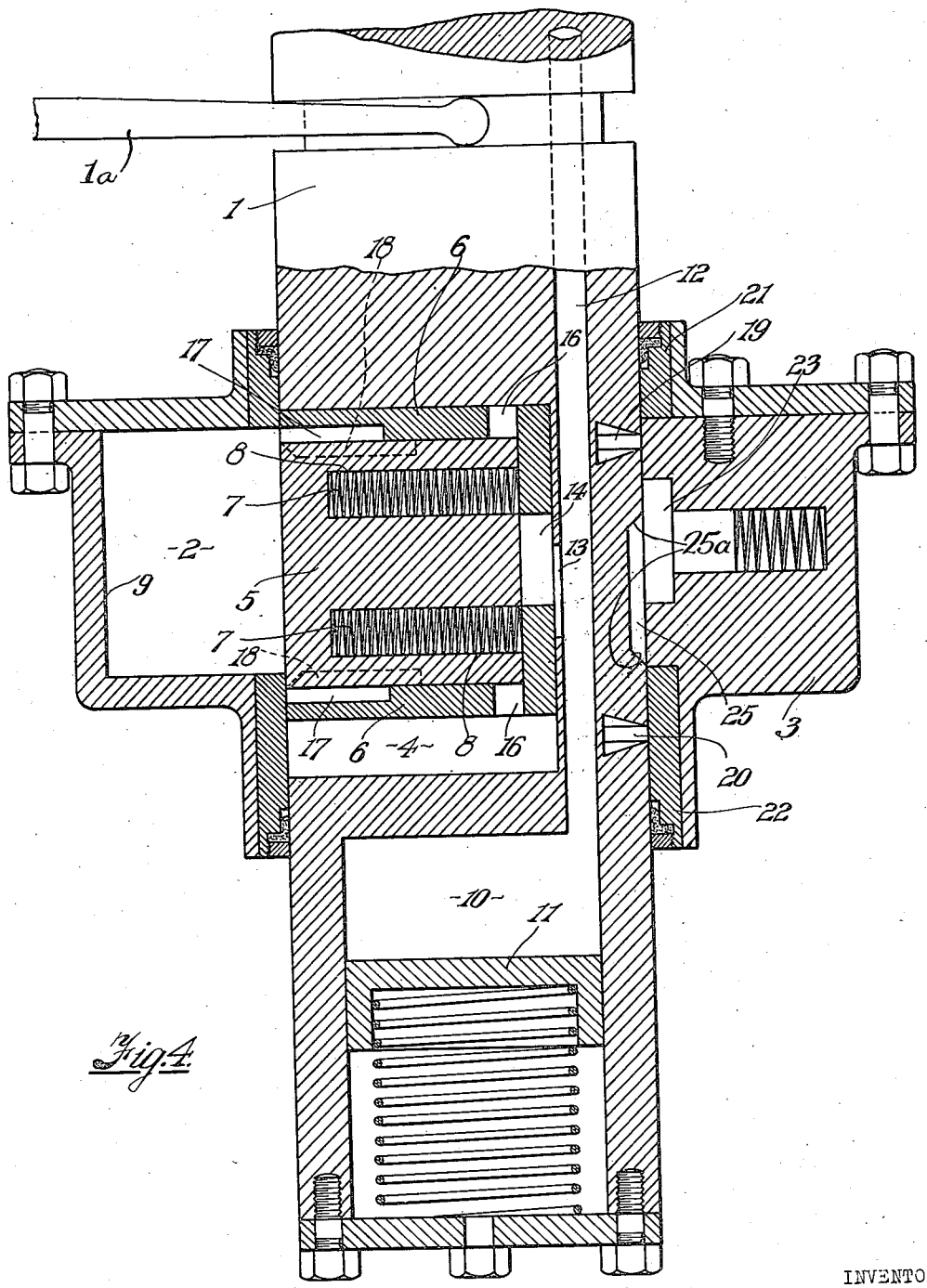

In the drawings:

Figure 1 is a sectional view through the improved clutch, the clutch elements being in the operative position, Figure 2 is a sectional view at right angles to Fig. 1 with the driving shaft and clutch elements shown in outside elevation, Figure 3 is a plan view of Fig. 1 with the end plate of the casing removed and Figure 4 is a view corresponding to Fig. 1 but with the clutch elements in the inoperative position.

As shown in the drawings the driving shaft 1 passes eccentrically through a circular chamber 2 formed in a casing 3 which constitutes the driven element, the chamber 2 being filled with oil or other fluid. Formed in the shaft 1 is a slot 4 within which is mounted a laterally movable vane 5, the said vane being guided in a yoke-shaped slide 6 which is capable of longitudinal movement in the slot 4. Compression springs 7 mounted in slots 8 formed in the vane 5 urge the vane in the absence of oil pressure into engagement with the wall 9 of the chamber 2. An oil reservoir 10 is formed in the shaft 1 below the slot 4, the oil therein being placed under pressure by means of a spring-loaded plunger 11. Oil is fed to the reservoir 10 through a bore 12, and under the control of a non-return valve (not shown), the said bore also communicating through a port 13 and a hole 14 formed in the slide 6 with the space 15 enclosed by the slide. The slide is provided near its rear end with two ports 16 which allow oil to pass from one side of the slide to the other, and near its front end with two grooves 17 of semi-circular cross section which in conjunction with chamfers 18 formed on the upper and lower edges of the vane 5 allow a restricted flow of oil from one side of the vane to the other. Two by-pass channels 19, 20 are formed in the shaft 1 extending around about two-thirds its periphery and co-operate with bearing sleeves 21, 22 respectively interposed between shaft 1 and the ends of the casing 3, the flow of oil through these channels being controlled by axial movement of the driving shaft as hereinafter described, the driving shaft being shifted axially, for example, by a shifting fork 1a engaging in a circumferential groove therein.

A device for locking the driving shaft solid to the casing 3 is provided comprising a spring-controlled key 23 mounted in a slot 24 in the casing 3 and adapted to engage in a recess 25, formed in the shaft 1 and provided with tapering or inclined side walls 25a at its ends.

The operation of the clutch is as follows:—

With the parts in the position shown in Fig. 1, a solid drive is transmitted from the shaft 1 to the casing 3 by the key 23 whilst the vane 5 is held in its projected position by the pressure of oil on its edge which faces the hole 14 in addition to the pressure exerted by the compression springs 7. In order to render the clutch inoperative or to cause it to impart a degree of slip to the drive the shaft 1 is moved axially by the fork 1a. Assuming that the shaft is moved downwardly, the following operations take place. As the shaft commences its downward movement the key 23 is forced out of the recess 25 by the engagement therewith of the inclined side walls 25a of the recess. During this initial movement the slide 6 remains stationary, oil in the slot 4 above the slide passing to the space below the slide through the ports 16. After the locking key 23 has been released the continued downward movement of the shaft 1 brings the by-pass channel 19 into communication with the chamber 2 and a degree of slip is imparted to the drive which now takes place solely through the vane 5. During this stage the vane rotates within the chamber 2 in the direction of the arrow, Fig. 3, and oscillates in the slide 6 with a frequency depending upon the size of the by-pass channel 19 and upon the degree of slip imparted by the chamfers 18 on the edges of the vane, which communicate with the grooves 17 of the slide 6 during about two-thirds of each revolution of the vane within the chamber 2. The upper side of the slot 4 is now in engagement with the top face of the slide 6 and, when the vane is in its retracted position, a further downward movement of the driving shaft moves the slide and vane bodily into the position shown in Figure 4, in which the clutch is inoperative and the shaft 1 rotates freely within the casing 3.

Reverse upward movement of the shaft 1 again brings the vane into the working position and the clutch operates with maximum slip imparted by the by-pass channel 19. As the shaft continues to move upwards the channel 19 is covered and, when the shaft reaches the medial position, the key 23 slips into the recess 25 and the parts are locked solid.

The provision of the chamfers 18 on the edges of the vane ensures that excessive pressure on the front of the blade will be by-passed to its rear.

Movement of the shaft in the opposite direction from its medial position produces exactly similar results, in this case the degree of slip being imparted by the by-pass channel 20.

When the shaft is not locked to the casing, and the casing tends to over-run the shaft the force acting on the trailing face of the vane, the outer edge of which is chamfered, resolves itself into two forces, one acting tangentially to the shaft and the other along the vane towards the shaft which thereby tends to move the vane inwards and so gives a degree of freewheeling effect.

I claim:

1. An hydraulic clutch comprising a driving member, an oil-filled chamber arranged eccentrically to said driving member and formed in the driven member, a vane slidably mounted in a slot formed in the driving member and adapted to work in said chamber, at least one by-pass channel adapted to allow a restricted flow of oil from one side of the vane to the other and to be controlled by an axial movement of the driving member, and means also controlled by axial movement of the driving member for moving the vane into an inoperative position.

2. An hydraulic clutch as claimed in claim 1, including means for locking the driving member to the driven member when the vane is in the working position in said chamber.

3. An hydraulic clutch comprising a driving member, an oil filled chamber arranged eccentrically to said driving member and formed in the driven member, a slot in said driving member, a yoke-shaped guide mounted in said slot, a vane slidably mounted in said guide and adapted to work in said chamber, spring-loaded means for locking the driving member to the driven member when the vane is in the working position in said chamber, and at least one by-pass channel formed in the driving member, and adapted to allow a restricted flow of oil from one side of the vane to the other and to be controlled by an axial movement of said driving member.

4. An hydraulic clutch comprising a driving member having a slot therein, a driven member having an oil-filled chamber therein arranged eccentrically to the driving member, a vane slidably mounted in the slot in the driving member and adapted to work in said chamber, a yoke-shaped slide within which the vane is guided during its oscillating movement in said chamber, said slide being mounted in the slot in the driving member for movement longitudinally therein, and at least one by-pass channel adapted to allow a restricted flow of oil from one side of the vane to the other and to be controlled by an axial movement of the driving member.

5. An hydraulic clutch comprising a driving member having a slot therein and also having two by-pass channels formed in its periphery, a driven member having an oil-filled chamber therein arranged eccentrically to the driving member, a vane slidably mounted in the slot in the driving member and adapted to work in said chamber, and cooperating bearing sleeves interposed between the ends of the driven member and the driving member and adapted to alternately establish communication between said channels and said chamber at one or the other side of the vane therein when axial movement is imparted to the driving member.

6. An hydraulic clutch comprising a driving member having a slot therein, a driven member having an oil-filled chamber therein arranged eccentrically to the driving member, a vane slidably mounted in the slot in the driving member and adapted to work in said chamber, a yoke-shaped slide mounted within the slot in the driving member, said slide having laterally extending arms between which the vane is guided, springs interposed between said vane and slide adapted to urge the vane into working position in said chamber, grooves being formed on the inner faces of said laterally extending arms and chamfers being formed on the upper and lower edge of the vane to cooperate with said grooves to allow a restricted flow of oil from one side of the vane to the other and at least one by-pass channel adapted to allow a restricted flow of oil from one side of the vane to the other and to be controlled by an axial movement of the driving member.

7. An hydraulic clutch comprising a driving member having a slot therein, a driven member having an oil-filled chamber therein arranged eccentrically to the driving member, a vane slidably mounted in the slot in the driving member and adapted to work in said chamber, at least one by-pass channel adapted to allow a restricted flow of oil from one side of the vane to the other and to be controlled by an axial movement of the driving member, an oil reservoir formed in the driving member, a spring-loaded plunger in said reservoir operative to maintain a pressure upon the oil, and means for conveying the oil under pressure to the inner edge of the vane.

HERBERT CLEAVE LEE.